Figure 1:
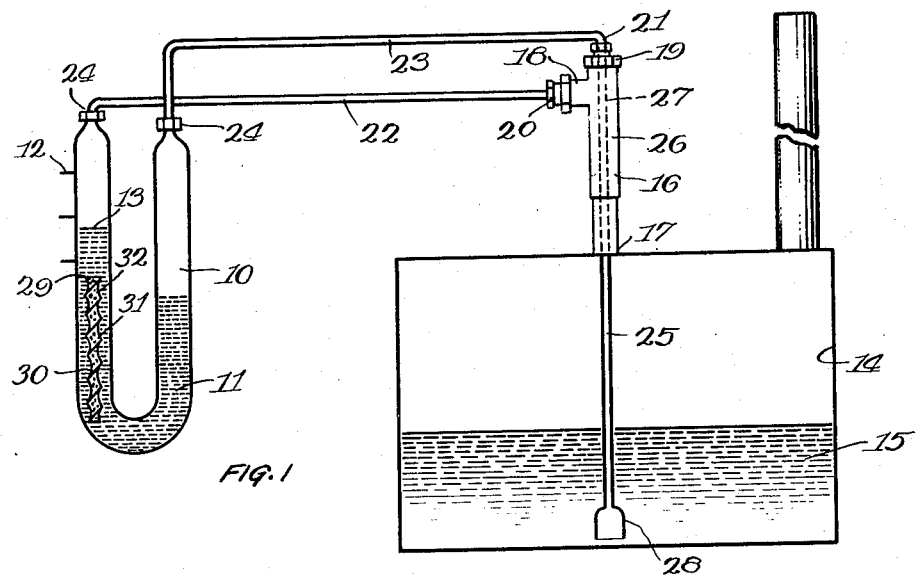

June 21, 1938.  C. V. OYEN  2,121,743

LIQUID GAUGE

Filed Feb. 21, 1927

Inventor:
Cornelius V. Oyen
By [signature] Atty.

Patented June 21, 1938

2,121,743

UNITED STATES PATENT OFFICE 2,121,743

LIQUID GAUGE

Cornelius V. Oyen, Chicago, Ill.

Application February 21, 1927, Serial No. 169,721

5 Claims. (Cl. 73—299)

This invention relates to indicators and more particularly to a measuring liquid stabilizer therefor, although certain features thereof may be employed with equal advantage for other purposes.

It contemplates more especially the provision of means for preventing fluctuations in an indicating medium irresponsive to changes in pressure, thereby enabling a more accurate reading at all times.

Gauges or indicators are generally associated with vehicles and other contrivances which are subjected to vibratory impulses which impart rapid fluctuations in the measuring medium employed in the gauge, thereby making it impossible or extremely difficult to obtain an accurate reading of the gauge during an interim wherein movement is imparted to the vehicle supporting the gauge.

To obviate such undesirable conditions, it has been found desirable to provide means in association with a measuring medium of a gauge to effect a condition therein in an effort to stabilize the level of the liquid even during a period of much vibration created during movement or operation of the vehicle.

One object of the present invention is to simplify the construction and improve the operation of devices of the character described.

Another object is the provision of means within a gauge to minimize the fluctuations of the measuring medium thereof.

A further object is to provide means for effecting a capillary attraction with the measuring medium of a gauge to render the liquid irresponsive to vibrations in the medium being measured.

A still further object is to provide unitary means for subjecting a gauge to a difference of pressure existing in a confining medium communicating therewith.

Other objects and advantages will appear from the following description of an illustrated embodiment of the present invention.

Figure 2:
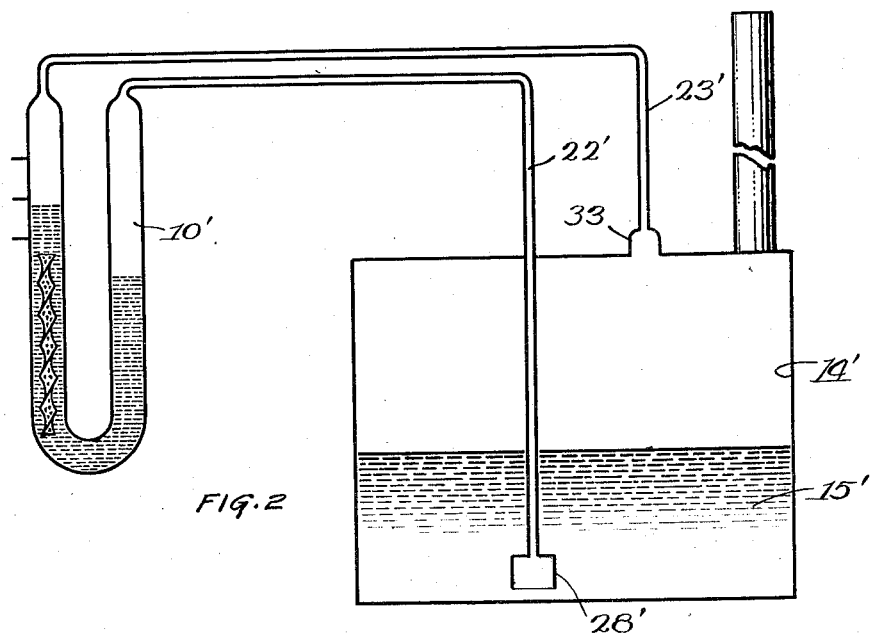

In the drawing:

Figure 1 is a view in elevation of a device embodying features of the present invention, there being shown novel means for subjecting a gauge to the differences of pressure existing in a pressure confining medium; and Figure 2 is a similar view showing another manner of subjecting a gauge to a difference of pressure existing in a pressure confining medium.

The structure selected for illustration comprises a gauge of any suitable construction, in this instance of the manometer type constituting a U-shaped transparent tube 10 adapted to confine any suitable measuring liquid 11 therein of known density. The tube 10 is calibrated in any appropriate manner such as by impressing graduations 12 on the surface thereof in a suitable position to enable the level 13 of the liquid 11 to be measured with reference thereto. Obviously, the calibrations 12 may be applied to the other leg or intermediate portions of the tube 10 should technical practice dictate such an arrangement.

The gauge is preferably subjected to the difference of pressure existing in a confining medium such as a tank 14 which contains liquid 15, the level of which is indicated by reference to the level of the measuring liquid 11 in the gauge 10 which may be situated remotely with respect to the tank 14. It is desirable to effect communication between the contents of the tank 14 and the gauge 10 through a single aperture, this being accomplished in the present instance by providing a T-union 16 having one branch 17 thereof in engagement with the tank 14. The other branches 18 and 19 are provided which threadedly engage independent tubes 22 and 23 in communication therewith.

The tubes 22 and 23 communicate with the open extremities of the gauge 10 in any suitable manner as by the unions 24 which effect a detachable connection therebetween. Another tube 25, constituting a continuation of the tube 23, is axially disposed within the union 16 to establish communication between tube 23 and the bottom of the tank 14, the tube 25 defining concentric passages 26 and 27 in the union 16 which communicate with the tubes 22 and 23 respectively.

The passage 26 communicates with the upper portion of the tank 14 whereby the liquid 11 in gauge 10 at one side is subjected to the pressure of the air contained within the tank 14 and tube 22 until such tank is completely filled. There being two air lines to the gauge 10 from tank 14, one 23 from the lower portion of the tank 14, and the other 22 from the upper portion of the tank 14, which line has just been referred to, added air pressure within the tank 14 above the level of liquid 15 is balanced and causes no fluctuations in the gauge 10. The level of liquid 11 in gauge 10 must therefore vary with the fluctuations in the level of the liquid 15 within the tank 14 and not otherwise.

When the tank 14 is filled, the liquid 15 closes the tube 17, sealing off a column of air extending to gauge 10 through tube 22. If the tank 14 is fed by a column extending above the top thereof as is usual in underground fuel oil tanks, filling of such column does not force the liquid 11 out of gauge 10 for the air sealed in tube 22 by closure of tube 17 prevents such escape. The liquid 11 in gauge 10 will therefore remain stationary in said gauge until the excess liquid 15 is removed from tank 14 and the level of such liquid 15 in said tank 14 drops sufficiently to unseal the passage from tank 14 to tube 17.

In this manner the gauge 10 is subjected to the pressure of the liquid contents 15, and the measuring liquid 11 thereof cannot possibly escape in the event the pressure or liquid height in the tank 14 exceeds the capacity of the gauge, it being likely that the space above the liquid 15 in the tank 14 is, under normal conditions, atmospheric pressure. In the event the tank 14 contains liquid 15 subjected to a vacuum feed system, the pressure would be below atmospheric. In either event, the graduations 12 for the gauge 10 are calibrated to indicate the quantity of liquid 15 within the tank 14 regardless of the pressure existing thereabove as both sides of the gauge 10 are subjected thereto.

The tube 25 has an enlarged concavity 28 at its lower extremity to confine a column of air therein so as to prevent the liquid 15 from being drawn therein, the air column confined within the tubes 23 and 25 serving as a pressure transmitting medium for causing the gauge liquid level to proportionally vary responsive to the quantity of liquid 15 in the tank 14. The enlarged concavity 28 prevents capillary attraction at the mouth of the tube 25, as it does not allow the liquid to come in contact with the mouth of tube 25, thereby insuring a proper pressure transmittal to the gauge 10.

The gauge 10 is advantageously employed for measuring liquid such as the fuel content in tanks carried on vehicles or other mechanisms subjected to vibratory impacts caused by the locomotion or operation thereof. As a result the measuring liquid 11 will ordinarily fluctuate to such an extent as to render accurate readings impossible. To obviate such defective conditions, the present invention contemplates the provision of means for preventing or substantially reducing the fluctuations in the measuring liquid 11 to a negligible degree.

The stabilizing means, in this instance, consists of a rod 29 immersed in the measuring liquid 11 of the gauge 10 to create capillary attraction between the liquid particles and the rod 29. Various expedients may be employed for increasing the capillary attraction between the liquid and rod 29, it being effective to provide a helical rib 30 thereon defining closely associated grooves 31 which effect a capillary attraction between the particles of liquid associated therewith.

Further, a plurality of apertures 32, is provided in the rod 29 of such miniature size to attract the particles therearound so that the rod 29 is not readily movable relative thereto in that there will not be any considerable fluctuations in the liquid 11 due to its association with the rod 29 which effectively interferes therewith. The interference is sufficient to substantially destroy movement of the liquid 11 which would be otherwise responsive to sudden changes in pressure. Obviously, either one or both of the expedients described in connection with rod 29, may be employed as technical practice may dictate, it being a purpose of this invention to provide any suitable means which controls the fluctuations of the measuring liquid to enable an accurate reading of the gauge 11 under all conditions.

In a modified embodiment of the invention disclosed in Figure 2, the gauge 10' is subjected to the pressure existing in the tank 14' by virtue of a pair of tubes 22' and 23' which project through independent passages in the tank 14'. It is to be noted that the tube 23' terminates in an enlarged concavity 33 which is in communication with the tank 14' so as to prevent the possibility of liquid being caught therein and retained by any capillary action which would be created in the event the tube 23' terminated in a restricted orifice in association with the tank, there always being a possibility of liquid being displaced in the vicinity thereof. Tube 22' like the tube 25 (Fig. 1) is provided with an enlarged concavity 28', the extremity thereof subjecting the gauge 10' to the correct pressure of the liquid 15', which would be somewhat modified and of a varying character in the event a restricted passage chamber 28' were employed due to capillary adhesion of the particles therein.

It will be apparent that a novel means has been provided to prevent fluctuations in the measuring liquid of the gauge as variations are registered thereby which are solely responsive to pressure changes in the liquid 15' and not by any movement of the gauge 10' or the liquid 15' caused by the locomotion or operation of the vehicle to which it is secured.

Various changes may be made in the embodiment of the invention herein specifically described without departing from or sacrificing any of the advantages thereof as defined in the appending claims.

I claim:—

1. In an indicator, a chamber having a section of pre-selected form, and a baffle disposed in said chamber, the exterior of said baffle having a helical rib, the periphery of which conforms generally to the shape of said chamber, the body of said baffle being foraminous whereby the capillary attraction between said baffle and the liquid in said chamber is materially augmented.

2. In combination with a pressure source, a transparent chamber in communication with said source, a measuring liquid in said chamber, and a body of foraminous material having a helical rib thereabout, the periphery of the rib portion of said body being spaced equidistantly from the walls of said chamber, said foraminous body and said rib structure creating increased capillary attraction between the liquid and said body to retard fluctuations of liquid in said chamber.

3. In combination with a pressure source, a transparent chamber in communication with said source, a measuring liquid in said chamber, and a rod submerged in said liquid, said submerged rod having a helix on the surface thereof uniformly spaced from the wall of said chamber and apertures therethrough to retard the movement of the liquid with respect to said rod.

4. In combination with a liquid tank, and a U-tube gauge containing a liquid, a conduit connected to one leg of said gauge, extending downwardly into the tank, and being in open communication with the liquid near the bottom of the tank, said conduit being of relatively slight diameter and being enlarged several times its diameter for an appreciable extent at its lower end, and a second conduit connected to the other leg of said gauge and terminating at the top of said tank and being in open communication therewith, said second conduit also being of a relatively slight diameter and being enlarged several times its diameter for an appreciable extent above its terminal, said enlargement being independent of, separated and spaced from, said first named conduit.

5. The combination with a tank containing liquid and having a filler pipe extending upwardly thereabove, of an air chamber within said tank and communicating with the liquid at the depth to be measured, a pressure gauge, means for placing said air chamber and one side of said pressure gauge in communication, and means for placing the other side of said pressure gauge and said tank above the liquid in communication to equalize the pressure therebetween, said last mentioned means having an enlarged chamber at its point of communication with said tank and at a level below that of the upper end of said filler pipe so that the liquid does not pass beyond the enlarged chamber into the remaining portion when the level of liquid in said filler pipe is above said enlarged chamber.

CORNELIUS V. OYEN.